US 9,282,569 B2

(12) United States Patent
Zhang et al.

(10) Patent No.: US 9,282,569 B2
(45) Date of Patent: Mar. 8, 2016

(54) LTE SINGLE-CARD DUAL-STANDBY MULTI-MODE TERMINAL AND METHOD FOR PROCESSING CONCURRENCY OF ITS CS SERVICE AND PS SERVICE

(71) Applicant: Huawei Device Co., Ltd., Shenzhen, Guangdong (CN)

(72) Inventors: Xiaopeng Zhang, Xi'an (CN); Shuiping Long, Beijing (CN); Landi Li, Shanghai (CN); Hui Jin, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 149 days.

(21) Appl. No.: 13/714,254

(22) Filed: Dec. 13, 2012

(65) Prior Publication Data

US 2013/0183988 A1    Jul. 18, 2013

(30) Foreign Application Priority Data

Dec. 13, 2011    (CN) .......................... 2011 1 0414203

(51) Int. Cl.
*H04W 72/00*    (2009.01)
*H04W 72/12*    (2009.01)
(Continued)

(52) U.S. Cl.
CPC ........ *H04W 72/1215* (2013.01); *H04W 76/026* (2013.01); *H04W 60/005* (2013.01); *H04W 72/12* (2013.01); *H04W 76/025* (2013.01); *H04W 88/06* (2013.01)

(58) Field of Classification Search
CPC ..... H04W 72/04; H04W 76/02; H04W 16/10; H04W 28/16
USPC ................... 455/450–456; 370/242, 329, 330
See application file for complete search history.

(56) References Cited

U.S. PATENT DOCUMENTS 5,333,179 A * 7/1994 Yamamoto et al. .......... 379/67.1
6,167,031 A * 12/2000 Olofsson et al. .............. 370/252
(Continued)

FOREIGN PATENT DOCUMENTS

CN    1364391 A    8/2002
CN    101483823 A    7/2009
(Continued)

OTHER PUBLICATIONS

Extended European Search Report in corresponding European Patent Application No. 12196861.4 (Jun. 12, 2013).

*Primary Examiner* — Vladimir Magloire
*Assistant Examiner* — Juan C Perez Tolentino
(74) *Attorney, Agent, or Firm* — Leydig, Voit & Mayer, Ltd.

(57) ABSTRACT

The present invention is applicable to the field of communications technologies, and provides an method, the method includes: when a CS service and PS service of a local LTE single-card dual-standby multi-mode terminal are concurrent, detecting, by a local LTE single-card dual-standby multi-mode terminal, whether a peer communication terminal that is performing voice communication with it is in a voice silent period; when detecting that the peer communication terminal is not in the voice silent period, receiving, by the local LTE single-card dual-standby multi-mode terminal, downlink data in an LTE system, and suspending, by the local LTE single-card dual-standby multi-mode terminal, sending of uplink data in the LTE system at the same time; and when detecting that the peer communication terminal is in the voice silent period, sending the uplink data and receiving the downlink data, by the local LTE single-card dual-standby multi-mode terminal, in the LTE system.

19 Claims, 2 Drawing Sheets

(51) Int. Cl.
*H04W 60/00* (2009.01)
*H04W 76/02* (2009.01)
*H04W 88/06* (2009.01)

(56) References Cited

U.S. PATENT DOCUMENTS

| | | | |
|---|---|---|---|
| 6,236,855 B1 * | 5/2001 | Austin | 455/423 |
| 7,280,524 B2 * | 10/2007 | Muller et al. | 370/349 |
| 7,483,418 B2 * | 1/2009 | Maurer | 370/354 |
| 8,165,594 B2 * | 4/2012 | Wang et al. | 455/452.1 |
| 2007/0206624 A1 * | 9/2007 | Majima | 370/433 |
| 2008/0101286 A1 * | 5/2008 | Wang | H04W 72/1268 370/329 |
| 2008/0232314 A1 * | 9/2008 | Schneider et al. | 370/329 |
| 2009/0093269 A1 | 4/2009 | Lee | |
| 2009/0221324 A1 * | 9/2009 | Pietila et al. | 455/552.1 |
| 2009/0259460 A1 * | 10/2009 | Jia et al. | 704/215 |
| 2012/0077445 A1 * | 3/2012 | Konno et al. | 455/67.11 |
| 2012/0147755 A1 * | 6/2012 | Chen et al. | 370/242 |
| 2014/0073371 A1 * | 3/2014 | Mujtaba et al. | 455/515 |

FOREIGN PATENT DOCUMENTS

| | | |
|---|---|---|
| CN | 101711050 A | 5/2010 |
| CN | 102088798 A | 6/2011 |
| CN | 102123466 A | 7/2011 |
| CN | 102158843 A | 8/2011 |
| CN | 102497629 A | 6/2012 |
| CN | 102523574 A | 6/2012 |
| EP | 2048899 A1 | 4/2009 |
| EP | 2560437 A1 | 2/2013 |
| WO | WO 0108426 A2 | 2/2001 |
| WO | WO 2011137851 A1 | 11/2011 |

* cited by examiner

LTE SINGLE-CARD DUAL-STANDBY MULTI-MODE TERMINAL AND METHOD FOR PROCESSING CONCURRENCY OF ITS CS SERVICE AND PS SERVICE

CROSS-REFERENCE TO RELATED APPLICATIONS

This application claims priority to Chinese Patent Application No. 201110414203.1, filed on Dec. 13, 2011, which is hereby incorporated by reference in its entireties.

FIELD OF THE INVENTION

The present invention relates to the field of communications technologies, and in particular, to an LTE single-card dual-standby multi-mode terminal and a method for processing concurrency of its CS service and PS service.

BACKGROUND OF THE INVENTION

Long term evolution (Long Term Evolution, LTE) is the biggest new technology research and development project that has been launched in the recent two years by the 3rd generation partnership project (3rd Generation Partnership Project, 3GPP), and may be regarded as a "quasi-4G" technology. The LTE improves and enhances an air access technology of 3G, and adopts orthogonal frequency division multiplexing (Orthogonal Frequency Division Multiplexing, OFDM) and multiple user equipment multiple input multiple output (Multiple Input Multiple Output, MIMO) as a basic technology for its wireless network evolution.

An LTE single-card dual-standby multi-mode terminal, for example, an LTE+2G/3G single-card dual-standby multi-mode terminal, resides in two communication subsystems at the same time, in which a circuit switched domain (Circuit Switched Domain, CS domain) resides in a 2G/3G system, and a packet switched domain (Packet Switched Domain, PS domain) resides in an LTE system. The LTE+2G/3G single-card dual-standby multi-mode terminal may perform a PS service in the LTE system and perform a CS service in the 2G/3G system at the same time through the two communication subsystems. Quality of a voice service of the LTE+2G/3G single-card dual-standby multi-mode terminal is consistent with quality of a voice service of a 2G/3G terminal, which avoids various defects caused by a CS Fallback (Circuit Switched Fallback) solution of a LTE terminal at present, such as time delay increase, handover failure, and system modification.

Both of the two communication subsystems (the LTE system and the 2G/3G system) of the LTE single-card dual-standby multi-mode terminal are both in a working state when the CS service and the PS service are concurrent. Radio frequencies of the two communication subsystems may receive and transmit wireless signals, and therefore mutual interference exists, that is, a transmitter in one mode affects sensitivity of a receiver in another mode. A mutual interference level of the LTE single-card dual-standby multi-mode terminal has a close relationship with transmit power and an interval between two frequency bands working at the same time. The mutual interference is larger in a case that the transmit power is larger, a distance between two antennas is shorter, and the interval between the frequency bands is smaller (for example, a frequency band of 1880-1920 MHz of the LTE/3G and a frequency band of 1805-1880 MHz of 2G). In the prior art, filters are used in sending and receiving directions of a radio frequency to reduce the interference. If the interference is large, a high-performance filter with better out-of-band attenuation characteristics may be considered for use.

However, a problem of the mutual interference of the LTE single-card dual-standby multi-mode terminal cannot be completely solved by using the filters in the prior art. Especially when two working radio frequency bands are close to each other, and a spatial distance between the antennas is close, a target value of the interference cannot be reduced even when the high-performance filter is used, and the cost of the terminal may be increased due to the use of the filters.

SUMMARY OF THE INVENTION

Embodiments of the present invention provide an LTE single-card dual-standby multi-mode terminal and a method for processing concurrency of its CS service and PS service, aiming to solve a problem that the use of a filter cannot completely solve mutual interference in the concurrency of the CS service and PS service of the LTE single-card dual-standby multi-mode terminal and causes cost increase in the prior art.

In one aspect, a method for processing concurrency of a CS service and PS service of an LTE single-card dual-standby multi-mode terminal is provided, where the method includes:

when a circuit switched CS service and a packet switched PS service of a local long term evolution LTE single-card dual-standby multi-mode terminal are concurrent, detecting, by the local LTE single-card dual-standby multi-mode terminal, whether a peer communication terminal that is performing voice communication with it is in a voice silent period;

when detecting that the peer communication terminal is not in the voice silent period, receiving, by the local LTE single-card dual-standby multi-mode terminal, downlink data in an LTE system, and suspending, by the local LTE single-card dual-standby multi-mode terminal, sending of uplink data in the LTE system at the same time; and when detecting that the peer communication terminal is in the voice silent period, sending the uplink data and receiving the downlink data, by the local LTE single-card dual-standby multi-mode terminal, in the LTE system.

In another aspect, an LTE single-card dual-standby multi-mode terminal is provided, where the LTE single-card dual-standby multi-mode terminal includes:

a detecting module, configured to, when a circuit switched CS service and a packet switched PS service of a local long term evolution LTE single-card dual-standby multi-mode terminal are concurrent, enable the local LTE single-card dual-standby multi-mode terminal to detect whether a peer communication terminal that is performing voice communication with the local LTE single-card dual-standby multi-mode terminal is in a voice silent period; and a control module, configured to, when the detecting module detects that the peer communication terminal is not in the voice silent period, enable the local LTE single-card dual-standby multi-mode terminal to receive downlink data in an LTE system, and enable the local LTE single-card dual-standby multi-mode terminal to suspend sending of uplink data in the LTE system at the same time, and when the detecting module detects that the peer communication terminal is in the voice silent period, the local LTE single-card dual-standby multi-mode terminal sends the uplink data and receives the downlink data in the LTE system.

In the embodiments of the present invention, when the CS service and PS service of the local LTE single-card dual-standby multi-mode terminal are concurrent, the local LTE single-card dual-standby multi-mode terminal detects whether the peer communication terminal that is performing the voice communication with the local LTE single-card dual-standby multi-mode terminal is in the voice silent period. When detecting that the peer communication terminal is not in the voice silent period, the local LTE single-card dual-standby multi-mode terminal receives the downlink data in the LTE system, and the local LTE single-card dual-standby multi-mode terminal suspends the sending of the uplink data in the LTE system at the same time. When detecting that the peer communication terminal is in the voice silent period, the local LTE single-card dual-standby multi-mode terminal sends the uplink data and receives the downlink data in the LTE system. Therefore, a problem of the mutual interference in the concurrency of the CS service and the PS service is shunned, so that quality of service is improved; and cost increase caused by a filter solution is avoided.

DETAILED DESCRIPTION OF THE EMBODIMENTS

To make the objectives, technical solutions, and advantages of the present invention clearer, the following describes the present invention in detail with reference to accompanying drawings and embodiments. It should be understood that the specific embodiments described here are merely used to explain the present invention and are not intended to limit the present invention.

Figure 1:
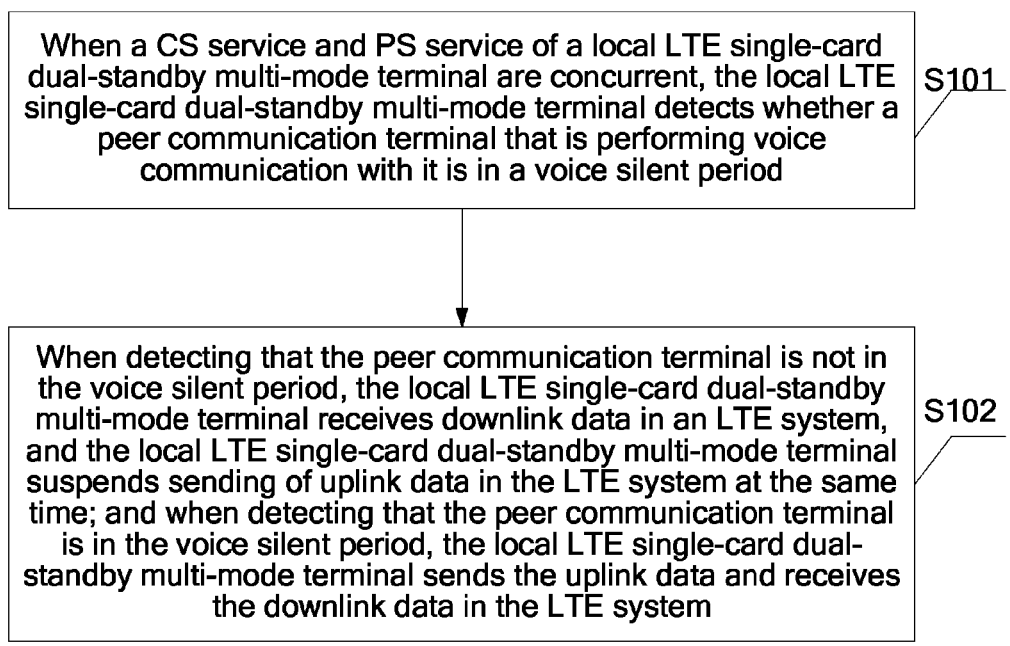
FIG. 1 is a flow chart of a method for processing concurrency of a CS service and PS service of an LTE single-card dual-standby multi-mode terminal according to a first embodiment of the present invention.

Referring to FIG. 1, a first embodiment of the present invention provides a method for processing concurrency of a CS service and PS service of an LTE single-card dual-standby multi-mode terminal. The method includes the following steps:

S101: When a CS service and PS service of a local LTE single-card dual-standby multi-mode terminal are concurrent, the local LTE single-card dual-standby multi-mode terminal detects whether a peer communication terminal that is performing voice communication with it is in a voice silent period, for example, the local LTE single-card dual-standby multi-mode terminal detects whether the peer communication terminal has a voice frame or whether the type of the voice frame is silent, and when there is no voice frame or the type of the voice frame is silent, determines that the peer communication terminal is in the voice silent period, where the voice silent period refers to a phase without voice data transmission;

S102: When detecting that the peer communication terminal is not in the voice silent period, the local LTE single-card dual-standby multi-mode terminal receives downlink data in an LTE system, and the local LTE single-card dual-standby multi-mode terminal suspends sending of uplink data in the LTE system at the same time; and when detecting that the peer communication terminal is in the voice silent period, the local LTE single-card dual-standby multi-mode terminal sends the uplink data and receives the downlink data in the LTE system.

In the method for processing the concurrency of the CS service and PS service of the LTE single-card dual-standby multi-mode terminal provided in the first embodiment of the present invention, step S101 may further include the following step:

The local LTE single-card dual-standby multi-mode terminal performing the voice communication with the peer communication terminal detects whether the local LTE single-card dual-standby multi-mode terminal is in the voice silent period. For example, the local LTE single-card dual-standby multi-mode terminal judges, through voice sampling and analysis, whether a user is speaking, and if all is ambient noise upon analysis after the sampling, determines that the local LTE single-card dual-standby multi-mode terminal is in the voice silent period.

At this time, the step that when detecting that the peer communication terminal is not in the voice silent period, the local LTE single-card dual-standby multi-mode terminal receives the downlink data in the LTE system, and the local LTE single-card dual-standby multi-mode terminal suspends the sending of the uplink data in the LTE system at the same time, in step S102, is specifically that:

when detecting that the local LTE single-card dual-standby multi-mode terminal is in the voice silent period and the peer communication terminal is not in the voice silent period, the local LTE single-card dual-standby multi-mode terminal reports that current channel quality is good to the LTE system of the local LTE single-card dual-standby multi-mode terminal through CQI (channel quality indication, channel quality indication), and the local LTE single-card dual-standby multi-mode terminal receives the downlink data in the LTE system; and the local LTE single-card dual-standby multi-mode terminal suspends the sending of the uplink data in the LTE system at the same time, where the uplink data may be buffered or discarded according to a buffer size; and when detecting that neither the local LTE single-card dual-standby multi-mode terminal nor the peer communication terminal is in the voice silent period, the local LTE single-card dual-standby multi-mode terminal reports that the current channel quality is poor through CQI, and the local LTE single-card dual-standby multi-mode terminal receives the downlink data in the LTE system, where the downlink data has interference, and is transmitted through an error correction mechanism on a physical layer in the prior art, for example, redundant coding, error correction bit, retransmission mechanism, and so on, and the local LTE single-card dual-standby multi-mode terminal suspends the sending of the uplink data in the LTE system at the same time, where the uplink data may be buffered or discarded according to the buffer size.

The step that when detecting that the peer communication terminal is in the voice silent period, the local LTE single-card dual-standby multi-mode terminal sends the uplink data and receives the downlink data in the LTE system, in step S102, is specifically that:

when detecting that the local LTE single-card dual-standby multi-mode terminal is not in the voice silent period and the peer communication terminal is in the voice silent period, the local LTE single-card dual-standby multi-mode terminal sends the uplink data and receives the downlink data in the LTE system, where the downlink data has interference, and is transmitted through the error correction mechanism on the physical layer in the prior art, for example, redundant coding, error correction bit, retransmission mechanism, and so on; and when detecting that both the local LTE single-card dual-standby multi-mode terminal and the peer communication terminal are in the voice silent period, the local LTE single-card dual-standby multi-mode terminal sends the uplink data and receives the downlink data in the LTE system, where the downlink data has no interference at this time.

Figure 2:
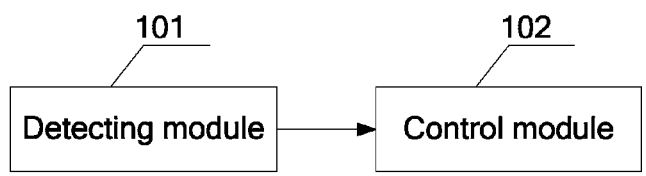
FIG. 2 is a block diagram of functional modules of an LTE single-card dual-standby multi-mode terminal according to the first embodiment of the present invention.

Referring to FIG. 2, the first embodiment of the present invention provides an LTE single-card dual-standby multi-mode terminal. The LTE single-card dual-standby multi-mode terminal includes:

a detecting module 101, configured to, when the CS service and PS service of the local LTE single-card dual-standby multi-mode terminal are concurrent, enable the local LTE single-card dual-standby multi-mode terminal to detect whether the peer communication terminal that is performing the voice communication with the local LTE single-card dual-standby multi-mode terminal is in the voice silent period, for example, enable the local LTE single-card dual-standby multi-mode terminal to detect whether the peer communication terminal has the voice frame or whether the type of the voice frame is silent, and when there is no voice frame or the type of the voice frame is silent, determine that the peer communication terminal is in the voice silent period; and a control module 102, configured to, when the detecting module detects that the peer communication terminal is not in the voice silent period, enable the local LTE single-card dual-standby multi-mode terminal to receive the downlink data in the LTE system, and enable the local LTE single-card dual-standby multi-mode terminal to suspend the sending of the uplink data in the LTE system at the same time, and when the detecting module detects that the peer communication terminal is in the voice silent period, the local LTE single-card dual-standby multi-mode terminal sends the uplink data and receives the downlink data in the LTE system.

In the LTE single-card dual-standby multi-mode terminal provided in the first embodiment of the present invention, the detecting module is further configured to enable the local LTE single-card dual-standby multi-mode terminal performing the voice communication with the peer communication terminal to detect whether the local LTE single-card dual-standby multi-mode terminal is in the voice silent period, for example, enable the local LTE single-card dual-standby multi-mode terminal to judge, through voice sampling and analysis, whether a user is speaking, and if all is ambient noise upon analysis after sampling, determine that the local LTE single-card dual-standby multi-mode terminal is in the voice silent period; and the control module is specifically configured to, when the detecting module detects that the local LTE single-card dual-standby multi-mode terminal is in the voice silent period and the peer communication terminal is not in the voice silent period, enable the local LTE single-card dual-standby multi-mode terminal to report that current channel quality is good to the LTE system of the local LTE single-card dual-standby multi-mode terminal through CQI, and enable the local LTE single-card dual-standby multi-mode terminal to receive the downlink data in the LTE system, and enable the local LTE single-card dual-standby multi-mode terminal to suspend the sending of the uplink data in the LTE system at the same time, and when the detecting module detects that neither the local LTE single-card dual-standby multi-mode terminal nor the peer communication terminal is in the voice silent period, the local LTE single-card dual-standby multi-mode terminal reports that the current channel quality is poor through CQI, and the local LTE single-card dual-standby multi-mode terminal receives the downlink data in the LTE system, where the downlink data is transmitted through an error correction mechanism on a physical layer in the prior art, for example, redundant coding, error correction bit, retransmission mechanism, and so on, and the local LTE single-card dual-standby multi-mode terminal suspends the sending of the uplink data in the LTE system at the same time;

when the detecting module detects that the local LTE single-card dual-standby multi-mode terminal is not in the voice silent period and the peer communication terminal is in the voice silent period, the local LTE single-card dual-standby multi-mode terminal sends the uplink data and receives the downlink data in the LTE system, where the downlink data is transmitted through the error correction mechanism on the physical layer in the prior art, for example, redundant coding, error correction bit, retransmission mechanism, and so on; and when the detecting module detects that both the local LTE single-card dual-standby multi-mode terminal and the peer communication terminal are in the voice silent period, the local LTE single-card dual-standby multi-mode terminal sends the uplink data and receives the downlink data in the LTE system, where the downlink data has no interference at this time.

Figure 3:
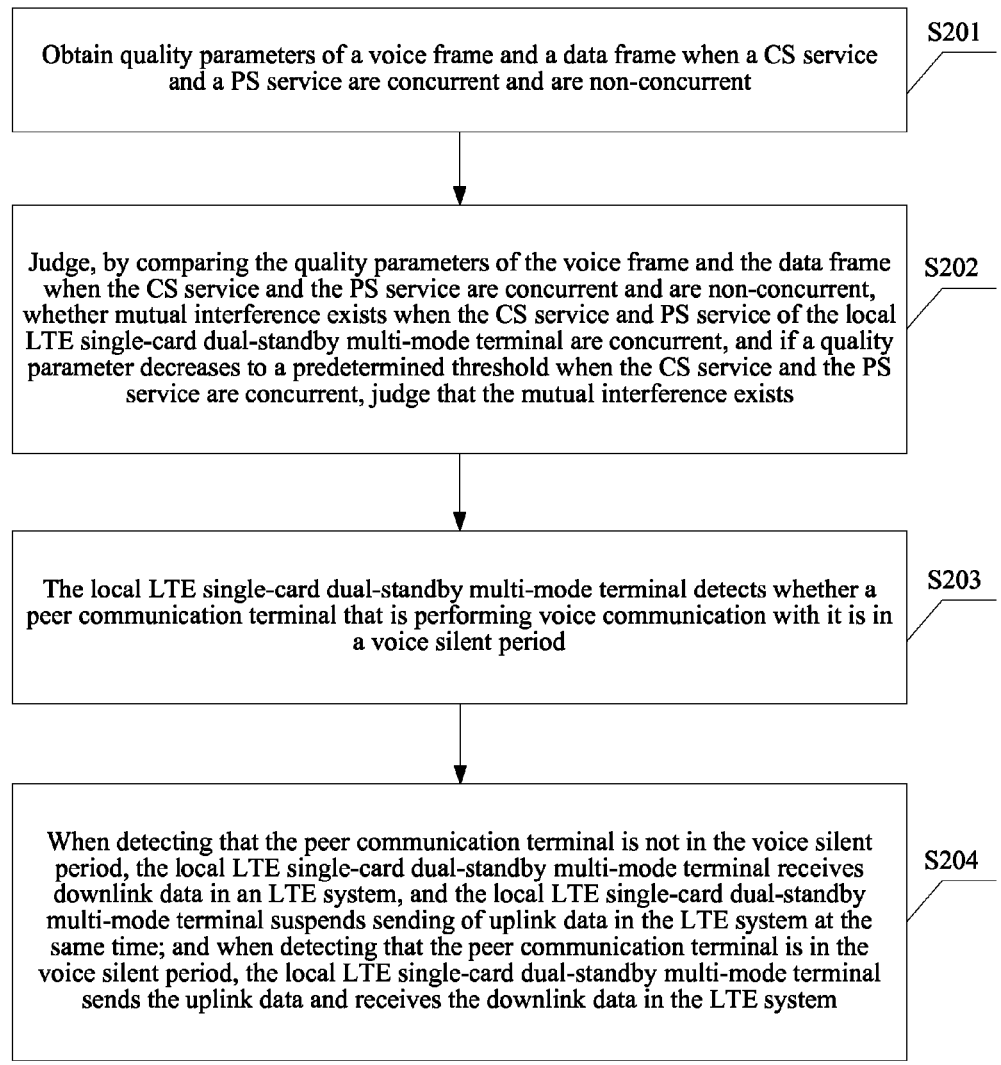
FIG. 3 is a flow chart of a method for processing concurrency of a CS service and PS service of an LTE single-card dual-standby multi-mode terminal according to a second embodiment of the present invention.

Referring to FIG. 3, a second embodiment of the present invention provides a method for processing concurrency of a CS service and PS service of an LTE single-card dual-standby multi-mode terminal. The method includes the following steps:

S201: Obtain quality parameters of a voice frame and a data frame when a CS service and a PS service are concurrent and are non-concurrent, where the quality parameters includes voice quality and/or a bit error rate;

S202: Judge, by comparing the quality parameters of the voice frame and the data frame when the CS service and the PS service are concurrent and are non-concurrent, whether mutual interference exists when the CS service and PS service of the local LTE single-card dual-standby multi-mode terminal are concurrent, and if a quality parameter decreases to a preset threshold when the CS service and the PS service are concurrent, judge that the mutual interference exists, and then execute step S203; if the quality parameter does not decrease to the preset threshold, do not take a shunning measure, where the preset threshold refers to a value when the quality parameter when the CS service and the PS service are concurrent decreases seriously relative to the quality parameter when the CS service and the PS service are non-concurrent and quality of service is already affected, and the value may be a percentage, for example, the quality parameter when the CS service and the PS service are concurrent is 60% of the quality parameter when the CS service and the PS service are non-concurrent;

S203: The local LTE single-card dual-standby multi-mode terminal detects whether a peer communication terminal that is performing voice communication with the local LTE single-card dual-standby multi-mode terminal is in a voice silent period, for example, the local LTE single-card dual-standby multi-mode terminal detects whether the peer communication terminal has a voice frame or whether the type of the voice frame is silent, and when there is no voice frame or the type of the voice frame is silent, determines that the peer communication terminal is in the voice silent period, where the voice silent period refers to a phase without voice data transmission; and S204: When detecting that the peer communication terminal is not in the voice silent period, the local LTE single-card dual-standby multi-mode terminal receives downlink data in an LTE system, and the local LTE single-card dual-standby multi-mode terminal suspends sending of uplink data in the LTE system at the same time; and when detecting that the peer communication terminal is in the voice silent period, the local LTE single-card dual-standby multi-mode terminal sends the uplink data and receives the downlink data in the LTE system.

In the method for processing the concurrency of the CS service and PS service of the LTE single-card dual-standby multi-mode terminal provided in the second embodiment of the present invention, step S203 may further include the following step:

The local LTE single-card dual-standby multi-mode terminal performing the voice communication with the peer communication terminal detects whether the local LTE single-card dual-standby multi-mode terminal is in the voice silent period. For example, the local LTE single-card dual-standby multi-mode terminal judges, through voice sampling and analysis, whether a user is speaking, and if all is ambient noise upon analysis after sampling, determines that the local LTE single-card dual-standby multi-mode terminal is in the voice silent period.

At this time, the step that when detecting that the peer communication terminal is not in the voice silent period, the local LTE single-card dual-standby multi-mode terminal receives the downlink data in the LTE system, and the local LTE single-card dual-standby multi-mode terminal suspends the sending of the uplink data in the LTE system at the same time, in step S204, is specifically that:

when detecting that the local LTE single-card dual-standby multi-mode terminal is in the voice silent period and the peer communication terminal is not in the voice silent period, the local LTE single-card dual-standby multi-mode terminal reports that current channel quality is good to the LTE system of the local LTE single-card dual-standby multi-mode terminal through CQI (channel quality indication, channel quality indication), and the local LTE single-card dual-standby multi-mode terminal receives the downlink data in the LTE system, and the local LTE single-card dual-standby multi-mode terminal suspends the sending of the uplink data in the LTE system at the same time, where the uplink data may be buffered or discarded according to a buffer size; and when detecting that neither the local LTE single-card dual-standby multi-mode terminal nor the peer communication terminal is in the voice silent period, the local LTE single-card dual-standby multi-mode terminal reports that the current channel quality is poor through CQI, and the local LTE single-card dual-standby multi-mode terminal receives the downlink data in the LTE system, where the downlink data has interference, and is transmitted through an error correction mechanism on a physical layer in the prior art, for example, redundant coding, error correction bit, retransmission mechanism, and so on, and the local LTE single-card dual-standby multi-mode terminal suspends the sending of the uplink data in the LTE system at the same time, where the uplink data may be buffered or discarded according to the buffer size.

The step that when detecting that the peer communication terminal is in the voice silent period, the local LTE single-card dual-standby multi-mode terminal sends the uplink data and receives the downlink data in the LTE system, in step S204, is specifically that:

when detecting that the local LTE single-card dual-standby multi-mode terminal is not in the voice silent period and the peer communication terminal is in the voice silent period, the local LTE single-card dual-standby multi-mode terminal sends the uplink data and receives the downlink data in the LTE system, where the downlink data has interference, and is transmitted through the error correction mechanism on the physical layer in the prior art, for example, redundant coding, error correction bit, retransmission mechanism, and so on; and when detecting that both the local LTE single-card dual-standby multi-mode terminal and the peer communication terminal are in the voice silent period, the local LTE single-card dual-standby multi-mode terminal sends the uplink data and receives the downlink data in the LTE system, where the downlink data has no interference at this time.

Figure 4:
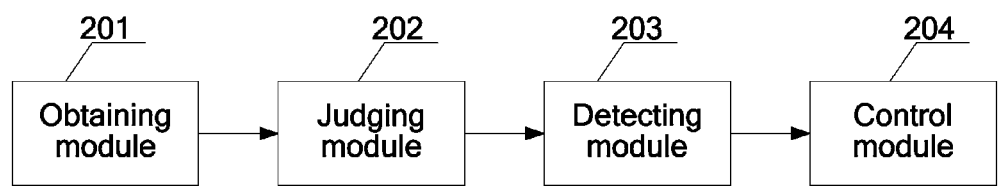
FIG. 4 is a block diagram of functional modules of an LTE single-card dual-standby multi-mode terminal according to the second embodiment of the present invention.

Referring to FIG. 4, the second embodiment of the present invention provides an LTE single-card dual-standby multi-mode terminal. The LTE single-card dual-standby multi-mode terminal includes:

an obtaining module 201, configured to obtain quality parameters of a voice frame and a data frame when a CS service and a PS service are concurrent and are non-concurrent, where the quality parameters includes: voice quality and/or a bit error rate;

a judging module 202, configured to judge, by comparing the quality parameters of the voice frame and the data frame when the CS service and the PS service are concurrent and non-concurrent, where the quality parameters are obtained by the obtaining module, whether mutual interference exists when the CS service and PS service of the local LTE single-card dual-standby multi-mode terminal are concurrent, and if the quality parameter decreases to the preset threshold when the CS service and the PS service are concurrent, judge that the mutual interference exists, and control a detecting module to perform detection; if the quality parameter does not decrease to the preset threshold, do not take the shunning measure, where the preset threshold refers to the value when the quality parameter decreases seriously and the quality of service is already affected;

a detecting module 203, configured to enable the local LTE single-card dual-standby multi-mode terminal to detect whether the peer communication terminal that is performing the voice communication with the local LTE single-card dual-standby multi-mode terminal is in the voice silent period, for example, enable the local LTE single-card dual-standby multi-mode terminal to detect whether the peer communication terminal has the voice frame or whether the type of the voice frame is silent, and when there is no voice frame or the type of the voice frame is silent, determine that the peer communication terminal is in the voice silent period; and a control module 204, configured to, when the detecting module detects that the peer communication terminal is not in the voice silent period, enable the local LTE single-card dual-standby multi-mode terminal to receive the downlink data in the LTE system, and enable the local LTE single-card dual-standby multi-mode terminal to suspend the sending of the uplink data in the LTE system at the same time, and when the detecting module detects that the peer communication terminal is in the voice silent period, the local LTE single-card dual-standby multi-mode terminal sends the uplink data and receives the downlink data in the LTE system.

In the LTE single-card dual-standby multi-mode terminal provided in the second embodiment of the present invention, the detecting module is further configured to enable the local LTE single-card dual-standby multi-mode terminal performing the voice communication with the peer communication terminal to detect whether the local LTE single-card dual-standby multi-mode terminal is in the voice silent period, for example, enable the local LTE single-card dual-standby multi-mode terminal to judge, through the voice sampling and analysis, whether the user is speaking, and if all is ambient noise upon analysis after the sampling, determine that the local LTE single-card dual-standby multi-mode terminal is in the voice silent period; and the control module is specifically configured to, when the detecting module detects that the local LTE single-card dual-standby multi-mode terminal is in the voice silent period and the peer communication terminal is not in the voice silent period, enable the local LTE single-card dual-standby multi-mode terminal to report that the current channel quality is good to the LTE system of the local LTE single-card dual-standby multi-mode terminal through CQI, and enable the local LTE single-card dual-standby multi-mode terminal to receive the downlink data in the LTE system, and enable the local LTE single-card dual-standby multi-mode terminal to suspend the sending of the uplink data in the LTE system at the same time, and when the detecting module detects that neither the local LTE single-card dual-standby multi-mode terminal nor the peer communication terminal is in the voice silent period, the local LTE single-card dual-standby multi-mode terminal reports that the current channel quality is poor through CQI, and the local LTE single-card dual-standby multi-mode terminal receives the downlink data in the LTE system, where the downlink data is transmitted through the error correction mechanism on the physical layer in the prior art, for example, redundant coding, error correction bit, retransmission mechanism, and so on, and the local LTE single-card dual-standby multi-mode terminal suspends the sending of the uplink data in the LTE system at the same time;

when the detecting module detects that the local LTE single-card dual-standby multi-mode terminal is not in the voice silent period and the peer communication terminal is in the voice silent period, the local LTE single-card dual-standby multi-mode terminal sends the uplink data and receives the downlink data in the LTE system, where the downlink data is transmitted through the error correction mechanism on the physical layer in the prior art, for example, redundant coding, error correction bit, retransmission mechanism, and so on; and when the detecting module detects that both the local LTE single-card dual-standby multi-mode terminal and the peer communication terminal are in the voice silent period, the local LTE single-card dual-standby multi-mode terminal sends the uplink data and receives the downlink data in the LTE system, where the downlink data has no interference at this time.

In the embodiments of the present invention, when the CS service and PS service of the local LTE single-card dual-standby multi-mode terminal are concurrent, the local LTE single-card dual-standby multi-mode terminal detects whether the peer communication terminal that is performing the voice communication with it is in the voice silent period. When detecting that the peer communication terminal is not in the voice silent period, the local LTE single-card dual-standby multi-mode terminal receives the downlink data in the LTE system, and the local LTE single-card dual-standby multi-mode terminal suspends the sending of the uplink data in the LTE system at the same time. When detecting that the peer communication terminal is in the voice silent period, the local LTE single-card dual-standby multi-mode terminal sends the uplink data and receives the downlink data in the LTE system. Therefore, a problem of the mutual interference in the concurrency of the CS service and the PS service is shunned, the quality of service is improved; and cost increase caused by a filter solution is avoided.

The foregoing is merely exemplary embodiments of the present invention, but is not intended to limit the present invention. Any modification, equivalent replacement, and improvement made without departing from the spirit and principle of the present invention shall fall within the protection scope of the present invention.

What is claimed is:

1. A method for processing concurrency of circuit switched (CS) service and packet switched (PS) service of a local long term evolution (LTE) single-card dual-standby multi-mode terminal, comprising:

when the CS service and the PS service of a local LTE single-card dual-standby multi-mode terminal are concurrent, detecting, by the local LTE single-card dual-standby multi-mode terminal, whether a peer communication terminal that is performing voice communication with the local LTE single-card dual-standby multi-mode terminal is in a voice silent period and detecting, by the local LTE single-card dual-standby multi-mode terminal, whether the local LTE single-card dual-standby multi-mode terminal is in a voice silent period;

when detecting that the peer communication terminal is not in the voice silent period, receiving, by the local LTE single-card dual-standby multi-mode terminal, downlink data in an LTE system, and suspending, by the local LTE single-card dual-standby multi-mode terminal, sending uplink data in the LTE system at the same time and reporting a current channel quality through a channel quality indication (CQI) according to a result of the detecting, by the local LTE single-card dual-standby multi-mode terminal, whether the local LTE single-card dual-standby multi-mode terminal is in a voice silent period; and when detecting that the peer communication terminal is in the voice silent period, sending the uplink data and receiving the downlink data, by the local LTE single-card dual-standby multi-mode terminal, in the LTE system wherein detecting that the peer communication terminal is not in the voice silent period, receiving, by the local LTE single-card dual-standby multi-mode terminal, the downlink data in the LTE system, and suspending, by the local LTE single-card dual-standby multi-mode terminal, the sending the uplink data in the LTE system at the same time and reporting a current channel quality through a channel quality indication (CQI) according to a result of the detecting, by the local LTE single-card dual-standby multi-mode terminal, whether the local LTE single-card dual-standby multi-mode terminal is in a voice silent period comprises:

when detecting that the local LTE single-card dual-standby multi-mode terminal is in the voice silent period and the peer communication terminal is not in the voice silent period, reporting, by the local LTE single-card dual-standby multi-mode terminal, that current channel quality is good to the LTE system of the local LTE single-card dual-standby multi-mode terminal through the CQI, and receiving, by the local LTE single-card dual-standby multi-mode terminal, the downlink data in the LTE system, and suspending, by the local LTE single-card dual-standby multi-mode terminal, the sending the uplink data in the LTE system at the same time; and when detecting that neither the local LTE single-card dual-standby multi-mode terminal nor the peer communication terminal is in the voice silent period, reporting, by the local LTE single-card dual-standby multi-mode terminal, that the current channel quality is poor through the CQI, and receiving, by the local LTE single-card dual-standby multi-mode terminal, the downlink data in the LTE system, wherein the downlink data is transmitted through an error correction mechanism on a physical layer, and suspending, by the local LTE single-card dual-standby multi-mode terminal, the sending the uplink data in the LTE system at the same time; and wherein when detecting that the peer communication terminal is in the voice silent period, sending the uplink data and receiving the downlink data, by the local LTE single-card dual-standby multi-mode terminal, in the LTE system comprises:

when detecting that the local LTE single-card dual-standby multi-mode terminal is not in the voice silent period and the peer communication terminal is in the voice silent period, sending the uplink data and receiving the downlink data, by the local LTE single-card dual-standby multi-mode terminal, in the LTE system, wherein the downlink data is transmitted through the error correction mechanism on the physical layer; and when detecting that both the local LTE single-card dual-standby multi-mode terminal and the peer communication terminal are in the voice silent period, sending the uplink data and receiving the downlink data, by the local LTE single-card dual-standby multi-mode terminal, in the LTE system, wherein the downlink data has no interference at this time.

2. The method according to claim 1, wherein before detecting, by the local LTE single-card dual-standby multi-mode terminal, whether the peer communication terminal that is performing the voice communication with the local LTE single-card dual-standby multi-mode terminal is in the voice silent period, the method further comprises:

obtaining quality parameters of a voice frame and a data frame when the CS service and the PS service are concurrent and are non-concurrent, respectively; and judging, by comparing the quality parameters of the voice frame and the data frame when the CS service and the PS service are concurrent and are non-concurrent, whether mutual interference exists when the CS service and PS service of the local LTE single-card dual-standby multi-mode terminal are concurrent, and if a quality parameter decreases to a preset threshold when the CS service and the PS service are concurrent, judging that the mutual interference exists, and executing detecting, by the local LTE single-card dual-standby multi-mode terminal, whether the peer communication terminal that is performing the voice communication with the local LTE single-card dual-standby multi-mode terminal is in the voice silent period.

3. The method according to claim 1, wherein before detecting, by the local LTE single-card dual-standby multi-mode terminal, whether the peer communication terminal that is performing the voice communication with the local LTE single-card dual-standby multi-mode terminal is in the voice silent period, the method further comprises:

obtaining quality parameters of a voice frame and a data frame when the CS service and the PS service are concurrent and are non-concurrent, respectively; and judging, by comparing the quality parameters of the voice frame and the data frame when the CS service and the PS service are concurrent and are non-concurrent, whether mutual interference exists when the CS service and PS service of the local LTE single-card dual-standby multi-mode terminal are concurrent, and if a quality parameter decreases to a preset threshold when the CS service and the PS service are concurrent, judging that the mutual interference exists, and wherein detecting, by the local LTE single-card dual-standby multi-mode terminal, whether the peer communication terminal that is performing the voice communication with the local LTE single-card dual-standby multi-mode terminal is in the voice silent period is performed in response to the judging that the mutual interference exists.

4. The method according to claim 2, wherein the quality parameter comprises at least one of the group consisting of (a) voice quality and (b) a bit error rate, and the preset threshold refers to a value when the quality parameter decreases to a point that quality of service is already affected.

5. The method according to claim 3, wherein the quality parameter comprises at least one of the group consisting of (a) voice quality and (b) a bit error rate, and the preset threshold refers to a value when the quality parameter decreases to a point that quality of service is already affected.

6. The method according to claim 1, wherein detecting, by the local LTE single-card dual-standby multi-mode terminal, whether the peer communication terminal that is performing the voice communication with the local LTE single-card dual-standby multi-mode terminal is in the voice silent period comprises:

detecting, by the local LTE single-card dual-standby multi-mode terminal, one of the group consisting of (a) whether the peer communication terminal has a voice frame, and (b) whether the type of the voice frame is silent, and when one of the following situation occurs: (i) there is no voice frame and (ii) the type of the voice frame is silent, determining that the peer communication terminal is in the voice silent period.

7. The method according to claim 1, wherein detecting, by the local LTE single-card dual-standby multi-mode terminal, whether the local LTE single-card dual-standby multi-mode terminal is in the voice silent period comprises:

judging, by the local LTE single-card dual-standby multi-mode terminal through voice sampling and analysis, whether a user is speaking, and if all is ambient noise upon analysis after the sampling, determining that the local LTE single-card dual-standby multi-mode terminal is in the voice silent period.

8. A long term evolution (LTE) single-card dual-standby multi-mode terminal, comprising:

a detecting module, configured to, when a circuit switched (CS) service and a packet switched (PS) service of a local LTE single-card dual-standby multi-mode terminal are concurrent, enable the local LTE single-card dual-standby multi-mode terminal to detect whether a peer communication terminal that is performing voice communication with the local LTE single-card dual-standby multi-mode terminal is in a voice silent period and to detect whether the local LTE single-card dual-standby multi-mode terminal is in a voice silent period; and a control module, configured to:

when the detecting module detects that the peer communication terminal is not in the voice silent period, enable the local LTE single-card dual-standby multi-mode terminal to receive downlink data in an LTE system, and enable the local LTE single-card dual-standby multi-mode terminal to suspend sending uplink data in the LTE system at the same time and to report a current channel quality through a channel quality indication (CQI) according to a result of detecting whether the local LTE single-card dual-standby multi-mode terminal is in a voice silent period;

when the detecting module detects that the peer communication terminal is in the voice silent period, enable the local LTE single-card dual-standby multi-mode terminal to send the uplink data and to receive the downlink data in the LTE system;

when the detecting module detects that the local LTE single-card dual-standby multi-mode terminal is in the voice silent period and the peer communication terminal is not in the voice silent period, enable the local LTE single-card dual-standby multi-mode terminal to report that current channel quality is good to the LTE system of the local LTE single-card dual-standby multi-mode terminal through the CQI, and enable the local LTE single-card dual-standby multi-mode terminal to receive the downlink data in the LTE system, and enable the local LTE single-card dual-standby multi-mode terminal to suspend the sending the uplink data in the LTE system at the same time;

when the detecting module detects that neither the local LTE single-card dual-standby multi-mode terminal nor the peer communication terminal is in the voice silent period, the local LTE single-card dual-standby multi-mode terminal reports that the current channel quality is poor through the CQI, and the local LTE single-card dual-standby multi-mode terminal receives the downlink data in the LTE system, wherein the downlink data is transmitted through an error correction mechanism on a physical layer, and the local LTE single-card dual-standby multi-mode terminal suspends the sending of the uplink data in the LTE system at the same time;

when the detecting module detects that the local LTE single-card dual-standby multi-mode terminal is not in the voice silent period and the peer communication terminal is in the voice silent period, the local LTE single-card dual-standby multi-mode terminal sends the uplink data and receives the downlink data in the LTE system, wherein the downlink data is transmitted through the error correction mechanism on the physical layer; and when the detecting module detects that both the local LTE single-card dual-standby multi-mode terminal and the peer communication terminal are in the voice silent period, the local LTE single-card dual-standby multi-mode terminal sends the uplink data and receives the downlink data in the LTE system, wherein the downlink data has no interference at this time.

9. The LTE single-card dual-standby multi-mode terminal according to claim 8, further comprising:
an obtaining module, configured to obtain quality parameters of a voice frame and a data frame when the CS service and the PS service are concurrent and are non-concurrent, respectively; and
a judging module, configured to judge, by comparing the quality parameters of the voice frame and the data frame when the CS service and the PS service are concurrent and are non-concurrent, where the quality parameters are obtained by the obtaining module, whether mutual interference exists when the CS service and PS service of the local LTE single-card dual-standby multi-mode terminal are concurrent, and if a quality parameter decreases to a preset threshold when the CS service and the PS service are concurrent, judge that the mutual interference exists, and control the detecting module to perform detection.

10. The LTE single-card dual-standby multi-mode terminal according to claim 8, further comprising:
an obtaining module, configured to obtain quality parameters of a voice frame and a data frame when the CS service and the PS service are concurrent and are non-concurrent, respectively; and
a judging module, configured to judge, by comparing the quality parameters of the voice frame and the data frame when the CS service and the PS service are concurrent and are non-concurrent, where the quality parameters are obtained by the obtaining module, whether mutual interference exists when the CS service and PS service of the local LTE single-card dual-standby multi-mode terminal are concurrent, and if a quality parameter decreases to a preset threshold when the CS service and the PS service are concurrent, judge that the mutual interference exists, and control the detecting module to perform detection.

11. The LTE single-card dual-standby multi-mode terminal according to claim 9, wherein the quality parameter comprises at least one of the group consisting of (a) voice quality and (b) a bit error rate, and the preset threshold refers to a value when the quality parameter decreases to a point that quality of service is already affected.

12. The LTE single-card dual-standby multi-mode terminal according to claim 10, wherein the quality parameter comprises at least one of the group consisting of (a) voice quality and (b) a bit error rate, and the preset threshold refers to a value when the quality parameter decreases to a point that quality of service is already affected.

13. A long term evolution (LTE) single-card dual-standby multi-mode terminal, comprising a computer readable storage medium and a processor, the processor being configured to execute a software program stored in the computer readable storage medium to perform the following:
when a CS service and a PS service of a local LTE single-card dual-standby multi-mode terminal are concurrent, detecting whether a peer communication terminal that is performing voice communication with the local LTE single-card dual-standby multi-mode terminal is in a voice silent period and detecting whether the local LTE single-card dual-standby multi-mode terminal is in a voice silent period;
when detecting that the peer communication terminal is not in the voice silent period, receiving downlink data in an LTE system, and suspending sending uplink data in the LTE system at the same time and reporting a current channel quality through a channel quality indication (CQI) according to a result of the detecting whether the local LTE single-card dual-standby multi-mode terminal is in a voice silent period; and
when detecting that the peer communication terminal is in the voice silent period, sending the uplink data and receiving the downlink data in the LTE system;
wherein detecting that the peer communication terminal is not in the voice silent period, receiving the downlink data in the LTE system, and suspending the sending the uplink data in the LTE system at the same time and reporting a current channel quality through a channel quality indication (CQI) according to a result of the detecting whether the local LTE single-card dual-standby multi-mode terminal is in a voice silent period comprises:

when detecting that the local LTE single-card dual-standby multi-mode terminal is in the voice silent period and the peer communication terminal is not in the voice silent period, reporting that current channel quality is good to the LTE system of the local LTE single-card dual-standby multi-mode terminal through the CQI, and receiving the downlink data in the LTE system, and suspending the sending the uplink data in the LTE system at the same time; and when detecting that neither the local LTE single-card dual-standby multi-mode terminal nor the peer communication terminal is in the voice silent period, reporting that the current channel quality is poor through the CQI, and receiving the downlink data in the LTE system, wherein the downlink data is transmitted through an error correction mechanism on a physical layer, and suspending the sending the uplink data in the LTE system at the same time; and wherein when detecting that the peer communication terminal is in the voice silent period, sending the uplink data and receiving the downlink data in the LTE system comprises:

when detecting that the local LTE single-card dual-standby multi-mode terminal is not in the voice silent period and the peer communication terminal is in the voice silent period, sending the uplink data and receiving the downlink data in the LTE system, wherein the downlink data is transmitted through the error correction mechanism on the physical layer; and when detecting that both the local LTE single-card dual-standby multi-mode terminal and the peer communication terminal are in the voice silent period, sending the uplink data and receiving the downlink data in the LTE system, wherein the downlink data has no interference at this time.

14. The LTE single-card dual-standby multi-mode terminal according to claim 13, wherein before detecting whether the peer communication terminal that is performing the voice communication with the local LTE single-card dual-standby multi-mode terminal is in the voice silent period, the processor further being configured to execute a software program stored in the computer readable storage medium to perform the following:

obtaining quality parameters of a voice frame and a data frame when the CS service and the PS service are concurrent and are non-concurrent, respectively; and judging, by comparing the quality parameters of the voice frame and the data frame when the CS service and the PS service are concurrent and are non-concurrent, whether mutual interference exists when the CS service and PS service of the local LTE single-card dual-standby multi-mode terminal are concurrent, and if a quality parameter decreases to a preset threshold when the CS service and the PS service are concurrent, judging that the mutual interference exists, and executing detecting whether the peer communication terminal that is performing the voice communication with the local LTE single-card dual-standby multi-mode terminal is in the voice silent period.

15. The LTE single-card dual-standby multi-mode terminal according to claim 13, wherein before detecting whether the peer communication terminal that is performing the voice communication with the local LTE single-card dual-standby multi-mode terminal is in the voice silent period, the processor further being configured to execute a software program stored in the computer readable storage medium to perform the following:

obtaining quality parameters of a voice frame and a data frame when the CS service and the PS service are concurrent and are non-concurrent, respectively; and judging, by comparing the quality parameters of the voice frame and the data frame when the CS service and the PS service are concurrent and are non-concurrent, whether mutual interference exists when the CS service and PS service of the local LTE single-card dual-standby multi-mode terminal are concurrent, and if a quality parameter decreases to a preset threshold when the CS service and the PS service are concurrent, judging that the mutual interference exists, and wherein detecting whether the peer communication terminal that is performing the voice communication with the local LTE single-card dual-standby multi-mode terminal is in the voice silent period is performed in response to the judging that the mutual interference exists.

16. The LTE single-card dual-standby multi-mode terminal according to claim 14, wherein the quality parameter comprises at least one of the group consisting of (a) voice quality and (b) a bit error rate, and the preset threshold refers to a value when the quality parameter decreases to a point that quality of service is already affected.

17. The LTE single-card dual-standby multi-mode terminal according to claim 15, wherein the quality parameter comprises at least one of the group consisting of (a) voice quality and (b) a bit error rate, and the preset threshold refers to a value when the quality parameter decreases to a point that quality of service is already affected.

18. The LTE single-card dual-standby multi-mode terminal according to claim 13, wherein detecting whether the peer communication terminal that is performing the voice communication with the local LTE single-card dual-standby multi-mode terminal is in the voice silent period comprises:

detecting one of the group consisting of (a) whether the peer communication terminal has a voice frame, and (b) whether the type of the voice frame is silent, and when one of the following situation occurs: (i) there is no voice frame and (ii) the type of the voice frame is silent, determining that the peer communication terminal is in the voice silent period.

19. The LTE single-card dual-standby multi-mode terminal according to claim 13, wherein detecting whether the local LTE single-card dual-standby multi-mode terminal is in the voice silent period comprises:

judging, through voice sampling and analysis, whether a user is speaking, and if all is ambient noise upon analysis after the sampling, determining that the local LTE single-card dual-standby multi-mode terminal is in the voice silent period.

* * * * *